C. C. SHEPPARD.
FIREARM.
APPLICATION FILED JULY 27, 1914.
1,291,689.
Patented Jan. 14, 1919.
5 SHEETS—SHEET 1.
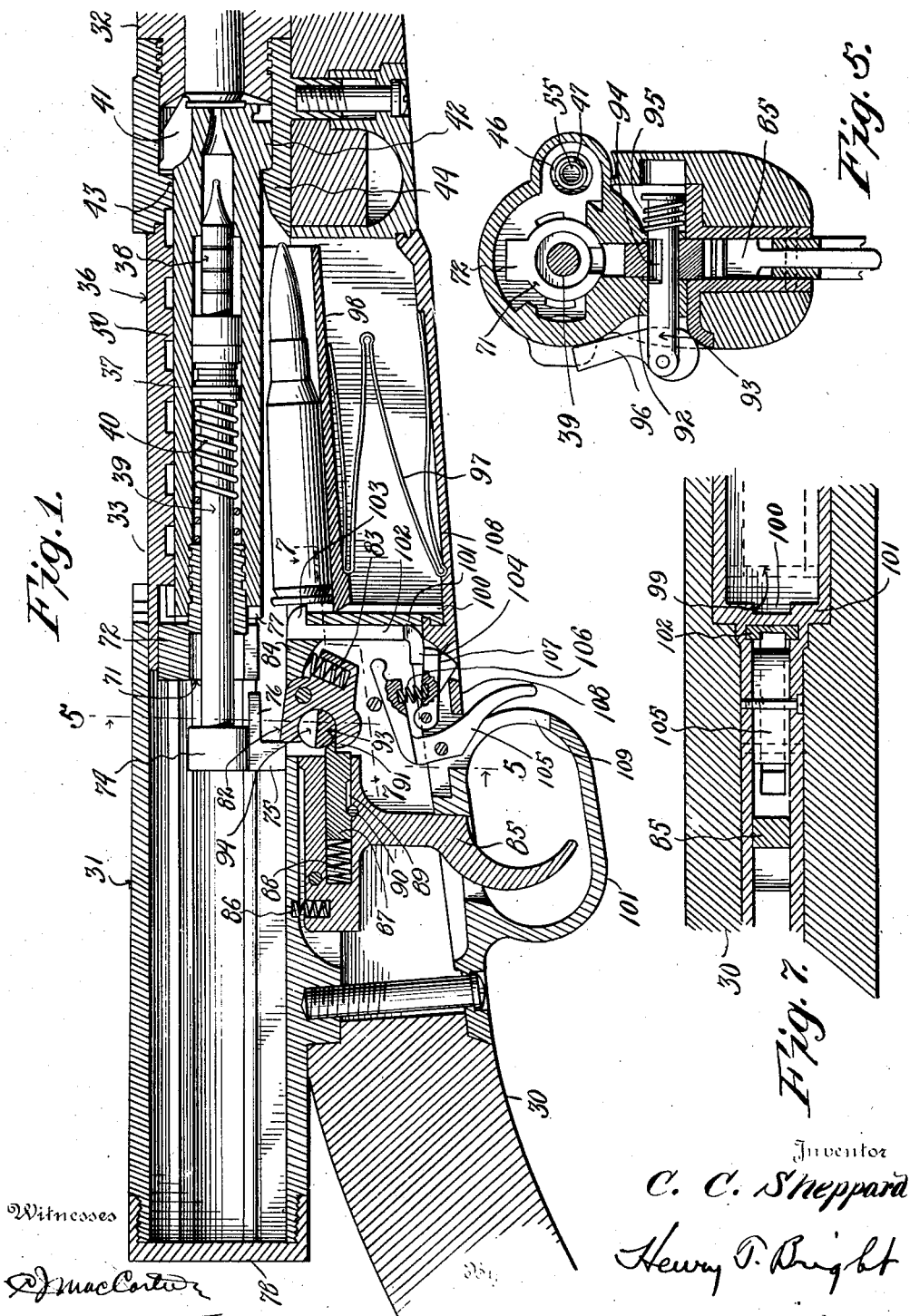

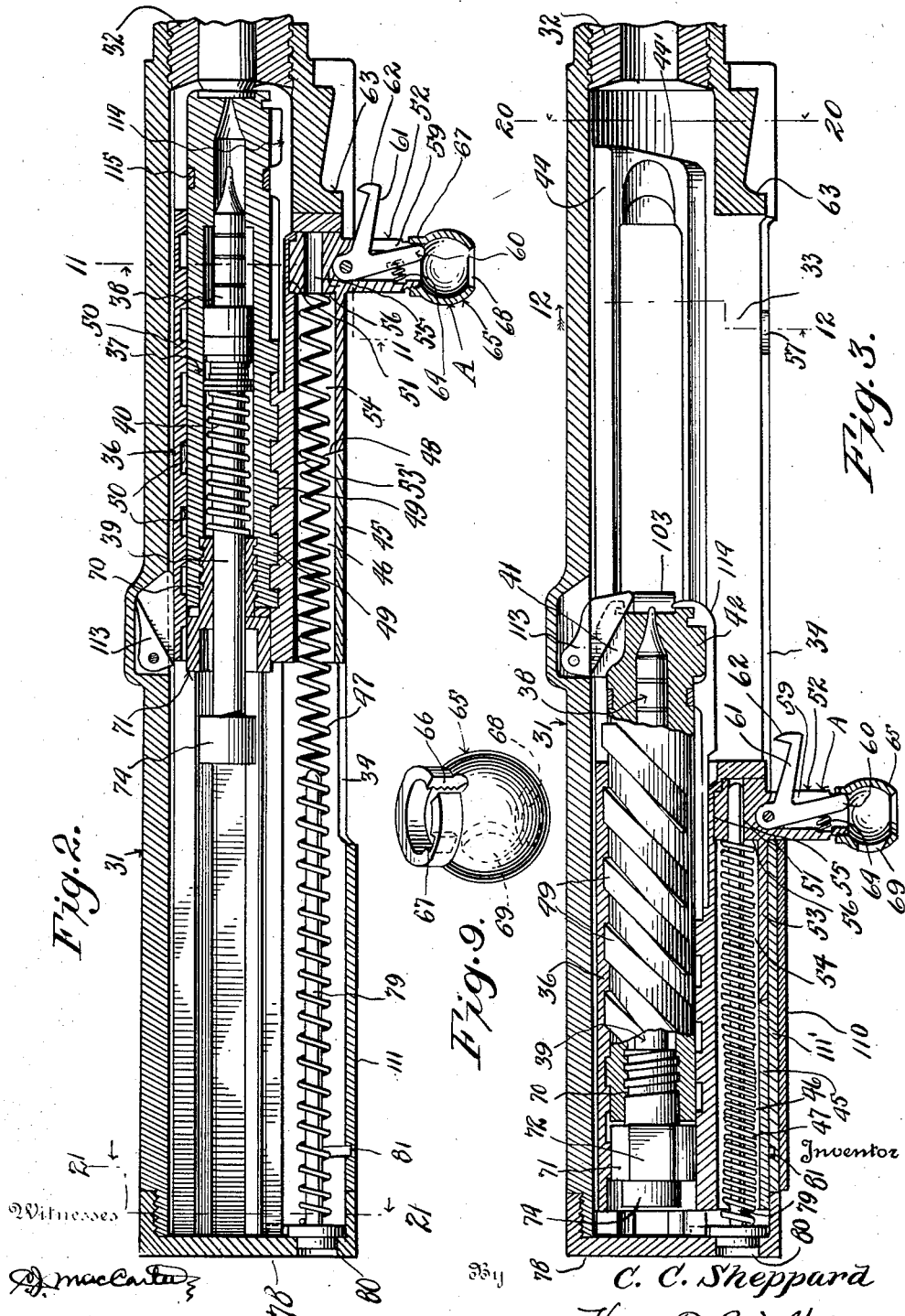

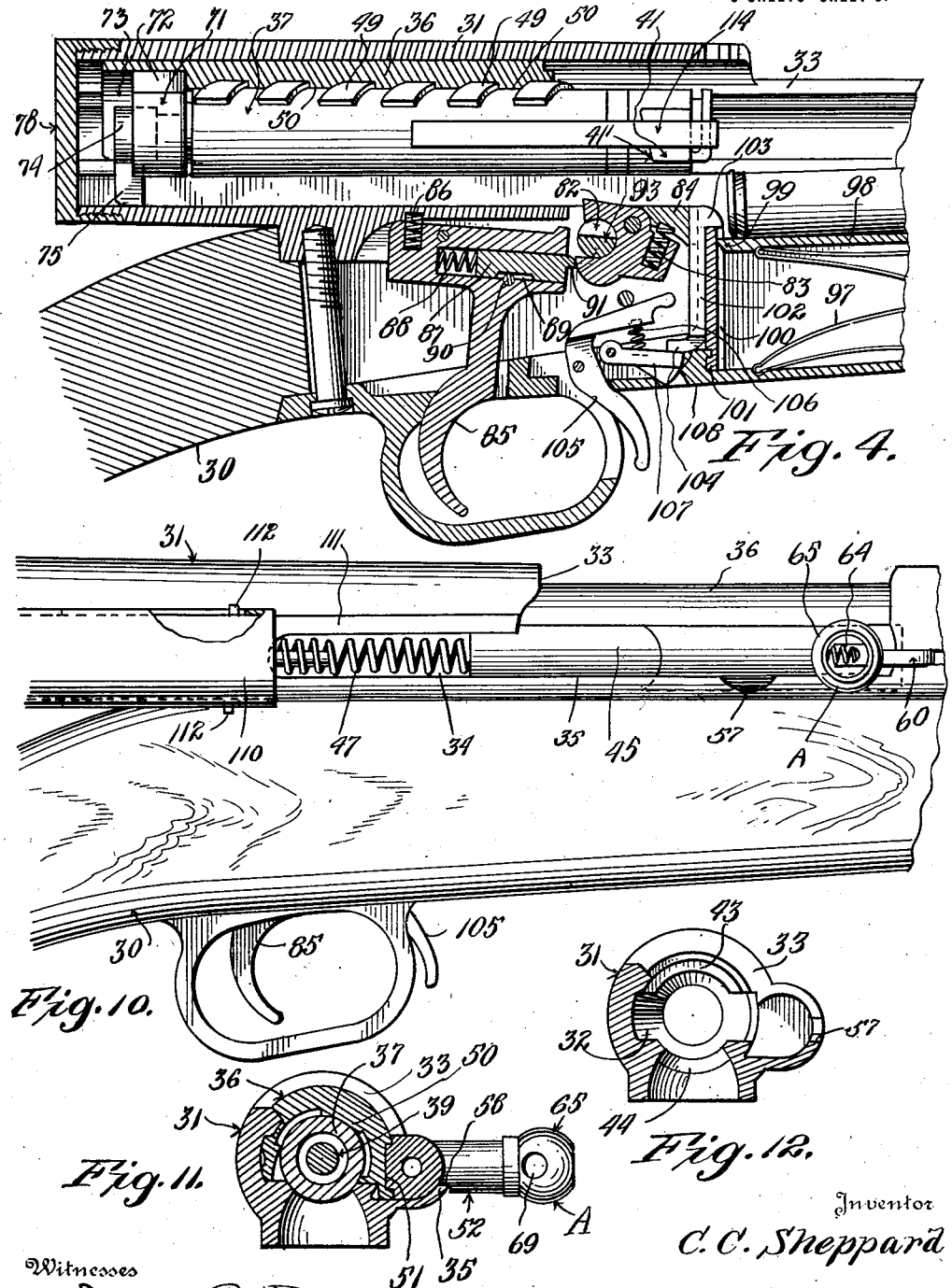

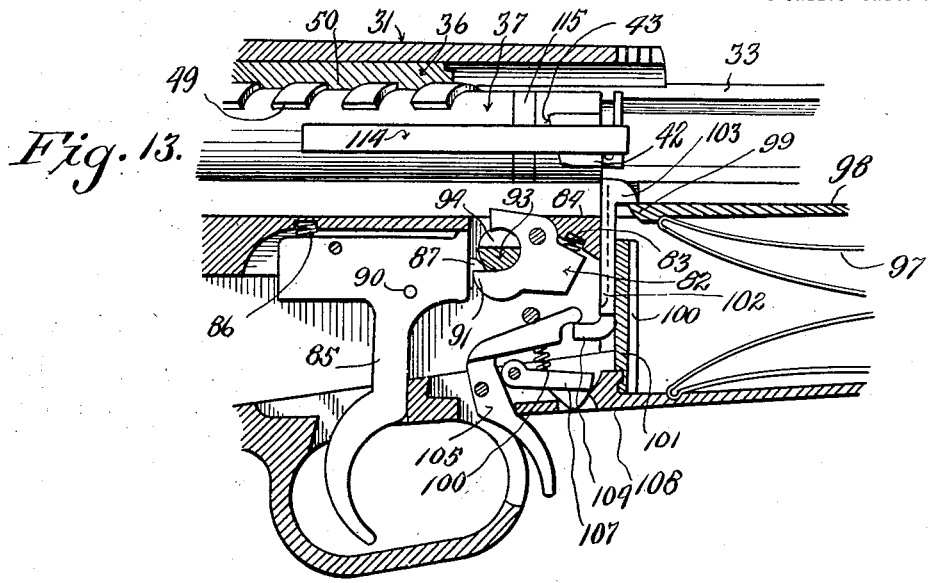
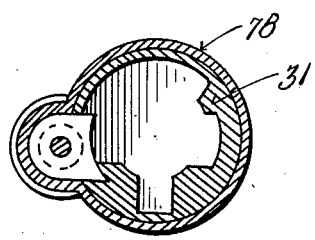
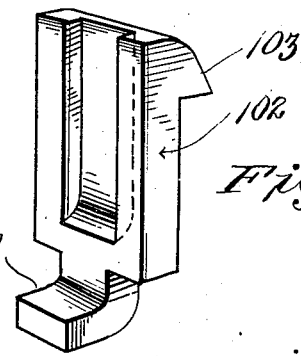
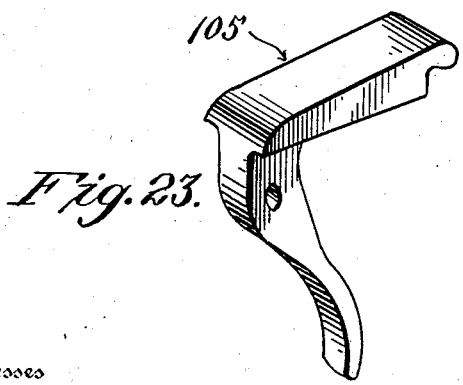
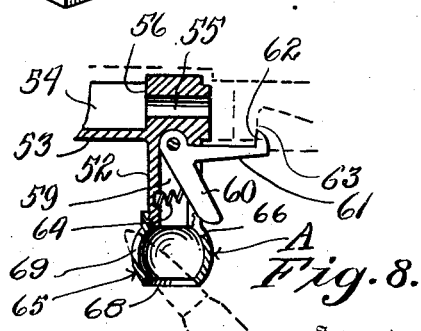

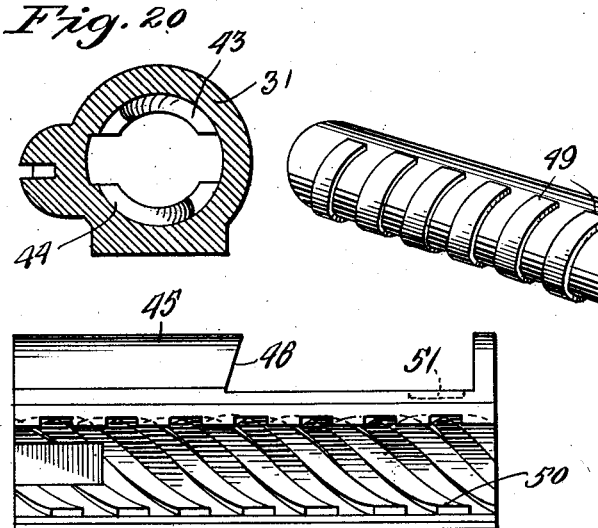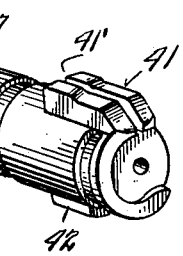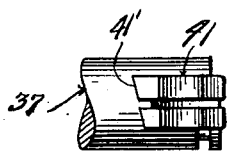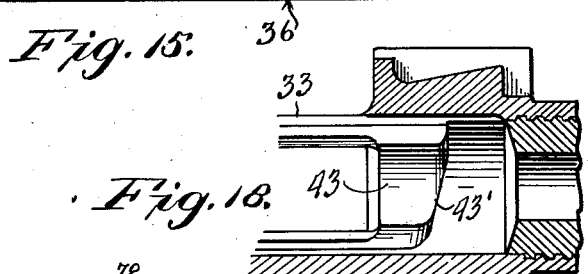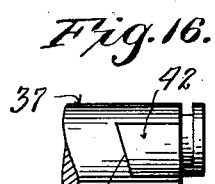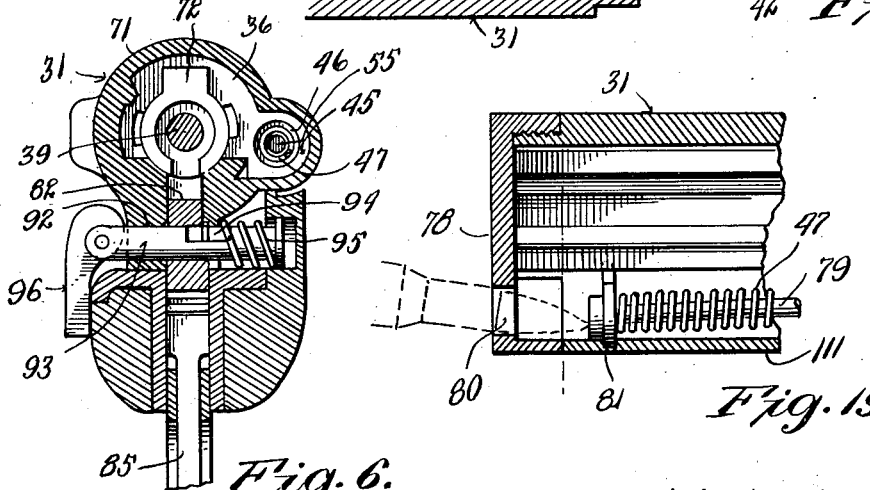

UNITED STATES PATENT OFFICE.

CREEDY C. SHEPPARD, OF BOSTON, MASSACHUSETTS, ASSIGNOR TO UNITED STATES ORDNANCE COMPANY, OF WASHINGTON, DISTRICT OF COLUMBIA, A CORPORATION OF VIRGINIA.

FIREARM.

1,291,689.   Specification of Letters Patent.   Patented Jan. 14, 1919.

Application filed July 27, 1914. Serial No. 853,288.

*To all whom it may concern:*

Be it known that I, CREEDY C. SHEPPARD, a citizen of the United States, and resident of Boston, in the county of Suffolk and State of Massachusetts, have invented certain new and useful Improvements in Firearms, of which the following is a specification.

My invention relates to firearms and particularly to those of the automatic type.

The object of my invention is to simplify the construction and operation of arms of this type, to reduce their weight and bulk, and to generally improve the arm.

A further object of my invention is to render the mechanism of the arm safe against dangerous blowbacks by providing an improved construction whereby the breech mechanism will remain locked when subjected to the high powder pressure obtaining while the bullet remains in the bore, but will operate to actuate the mechanism under the influence of the comparatively low pressure obtaining as the bullet leaves the bore.

A still further object of my invention resides in the provision of an automatic firearm embodying a simple and efficient construction for effecting the automatic action thereof and which comprises relatively few parts so arranged that military arms of the magazine type can be readily converted to include the essentials of such construction without dispensing with the use of a large number of their present components.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a vertical section of my improved firearm with the breech-bolt in locked or firing position;

Fig. 2, a horizontal section of the arm with the breech-bolt in locked or firing position;

Fig. 3, a view similar to Fig. 2 with the breech-bolt fully retracted and shown partly in elevation;

Fig. 4, a partial vertical section of the arm with the trigger and breech-bolt fully retracted and the latter shown in elevation;

Fig. 5, a section on the line 5—5 of Fig. 1;

Fig. 6, a view similar to Fig. 5 showing the safety lock in active position;

Fig. 7, a section on the line 7—7 of Fig. 1;

Fig. 8, a fragmental horizontal section disclosing the operating handle and showing the cap thereof adjusted to permit the latch carried by the handle to lock the mechanism of the arm against automatic action;

Fig. 9, a perspective view of the cap of the operating handle on an enlarged scale;

Fig. 10, a partial side elevation of the arm with the parts in firing position;

Fig. 11, a section on the line 11—11 of Fig. 2;

Fig. 12, a section on the line 12—12 of Fig. 3;

Fig. 13, a partial vertical section with the breech-bolt fully retracted after firing the last cartridge contained in the magazine;

Fig. 14, a perspective view of the breech-bolt;

Fig. 15, a view of the slide looking at the inner face thereof;

Fig. 16, a top view of the forward end of the breech-bolt showing the upper locking lug and the inclination of its locking face;

Fig. 17, a bottom view of the forward end of the breech-bolt showing the lower locking lug and the inclination of its locking face;

Fig. 18, a horizontal section through the forward end of the receiver looking toward the top and disclosing the upper locking lug thereof;

Fig. 19, a partial horizontal section of the arm showing the guide rod of the recoil spring positioned to permit the application and removal of the closing cap to and from the rear end of the receiver;

Fig. 20, a section on the line 20—20 of Fig. 3;

Fig. 21, a section on the line 21—21 of Fig. 2;

Fig. 22, a perspective view of the bolt stop, and

Fig. 23, a perspective view of the bolt stop trigger.

Referring to the drawings the improved arm is shown as comprising a stock 30 having mounted thereon a receiver 31 in the forward end of which is screwed a barrel 32. The receiver 31 is approximately cylindrical in its outside dimensions while the interior thereof conforms to the section shown in Fig. 5. A cartridge ejecting opening 33 is provided in the receiver as is also a longitudinal slot 34 communicating at its forward end with the opening 33 and said opening and slot forming a guide surface 35 for a purpose that will hereinafter appear.

Slidably and non-rotatably mounted in the receiver 31 is a slide 36 which is approximately semi-circular in cross section. Disposed within the slide 36 is a two-motion breech-bolt 37 in which is contained a firing pin or striker 38, firing pin rod 39, and main spring 40. Formed on the forward end of the breech-bolt 37 are upper and lower locking lugs 41 and 42 respectively, which, in the locked position of said bolt, engage locking lugs 43 and 44 formed on the interior of the receiver 31. The locking faces of the locking lugs of the breech-bolt are inclined at an angle to a plane perpendicular to the axis of rotation of the bolt as at 41' and 42', while the locking faces of the locking lugs on the receiver 31 are correspondingly inclined as at 43' and 44'. The slide 36 is provided with a lateral enlargement 45 in which is drilled a passage 46 running parallel to the bolt 37 and through which passage a recoil spring 47 extends for the purpose of urging the slide toward its forward position in a manner that will hereinafter appear. The forward end of the enlargement 45 terminates rearwardly of the forward end of the slide and is inclined rearwardly in the direction of the bolt 37 as at 48. On the exterior surface of the bolt 37 are lugs or cams 49 cut in the form of multiple screw threads and engaging similar cams 50 cut on the interior face of the slide. While these cams 49 and 50 are shown in multiple it will be obvious that a single cam on the bolt engaging in a corresponding recess in the slide could be employed with success but the multiple cams are considered preferable as experience has demonstrated that this construction tends to give smoother operation.

The slide 36 is provided adjacent its forward end with a pivot hole 51 for an operating handle A. This operating handle A comprises a stem 52 having a lateral extension 53 adjacent the inner end thereof, said extension being provided with a longitudinal bore 54 corresponding to the passage 46 and having a reduced portion 55 extending transversely through the inner end of the stem 52 and forming a shoulder 56. The free end of the extension 53 is inclined forwardly away from the breech-bolt as at 53' so as to correspond with the forward end of the enlargement 45. The guide surface 35 is provided with a clearance cut or recess 57 and in order to attach the handle A to the slide the latter is pushed forward until the pivot hole 51 is directly above the clearance cut 57. The operating handle in then inserted in the pivot hole 51 with the extension 53 pointing upwardly. Said handle is then rotated until the bore 54 registers with the passage 46. This connection of the operating handle to the slide is effected before the recoil spring 47 is applied and said spring bears at its forward end against the shoulder 56. The inclined ends 48 and 53' of the enlargement 45 and extension 53 respectively insure a tight fit of the parts, while the operating handle is prevented from rotating by the recoil spring 47 and by a flat surface 58 formed on the stem 52 and engaging the guide surface 35 at all points of its travel excepting the clearance cut 57. The stem 52 of the operating handle A is provided with a longitudinal recess 59 opening through its outer end and also through its side. Pivotally mounted in the recess 59 is a lever 60 provided with a forwardly projecting toe 61 having a nib 62 on its free end, which latter is adapted to engage a shoulder 63 formed on the receiver for the purpose of locking the slide 36 against rearward movement when it is desired to operate the arm by hand. The lever 60 is operated upon by a spring 64 which is adapted to hold the free end of said lever in position to project through the recess 59 to the exterior of the stem 52 so that it will be pressed inward to disengage the nib 62 from the shoulder 63 when the handle is grasped to manually retract the slide. The stem 52 is threaded on its outer end to receive a knob 65. This knob is provided with a slot 66 through which the free end of the lever 60 projects in hand operation of the arm, and is further provided with an internal recess 67 to retain the free end of the lever 60 within the knob so as to prevent the nib 62 from engaging the shoulder 63 in automatic action of the arm. To facilitate rotation of the knob 65 and operating handle a notch 68 is cut on the outer end of the knob and a hole 69 drilled in its side to engage the side and point of a bullet as shown in Fig. 8. By thus using a loaded cartridge as a lever the knob or knob and handle can be readily rotated.

On the interior of the rear end of the bolt 37 are cut threads 70 in which is screwed a sleeve 71. On the top of this sleeve is a lug 72 fitting in a corresponding recess 73 formed in the slide and thus preventing the sleeve from rotating after the bolt is assembled to the slide. This sleeve 71 serves as a guide for a cocking piece 74 attached to the firing pin rod 39 and also as a seat for the rear end of the main spring 40. The bottom of the cocking piece 74 has a toe 75 which is engaged by a sear to be hereinafter referred to. Another toe 76 is formed on the cocking piece 74 at its front end and is adapted to engage in a notch 77 in the rear end of the bolt when the bolt is in locked position and the sear disengaged from the toe 75. Should the bolt not be fully rotated the notch 77 does not register with the toe 76 and the firing pin or striker 38 is prevented from going forward far enough to strike the primer.

The rear end of the receiver 31 is closed by a cap 78 threaded to the receiver. The cap is prevented from rotating after assembling by the rear end of a recoil spring guide 79 which enters a hole 80 in the cap, the portion of the recoil spring guide directly in front of the cap conforming to the interior of the receiver at that point. For convenience in assembling a recess 81 is formed in the inner wall of the receiver, same being adapted to receive the portion of the recoil spring guide normally disposed directly in advance of the cap 78. In applying or removing the cap 78 the recoil spring guide is pushed forward by means of a bullet point or other sharp instrument and pressed inward to engage in the recess 81 which holds said guide free of the cap in assembling and disassembling the latter. By pressing with the cartridge again the recoil spring guide may be disengaged from the recess 81 and withdrawn through the rear end of the receiver when the cap is removed, or locked to the cap when it is in position.

It will be noted in connection with the mounting of the recoil spring 47 that when said spring is compressed and the slide in its retracted or recoiled position, the compressed spring is contained entirely within the limits of the slide, thus requiring no extra length on the rear of the receiver to house it as in most arms of this type, it being only essential to provide a receiver but slightly longer than is used on most magazine arms and enables many such arms to be converted to the automatic type using the original stocks.

Pivoted to the receiver 31 is a sear 82 which carries within it a spring 83 bearing against a lug 84 on the receiver, said spring normally holding the sear in position to engage the toe 75 on the cocking piece 74 during forward movement of the bolt 37. Also pivoted to the receiver 31 is a trigger 85 which has seated therein a spring 86 engaging the receiver 31 and constantly tending to rotate the trigger so as to move its forward end upwardly. Within the trigger is a plunger trigger catch 87 urged forward by a spring 88. This catch is cut away on its under side as at 89 to receive a pin 90 passing through the trigger, said pin permitting limited longitudinal movement of the catch but preventing same from rotating or being disengaged from the trigger. When the trigger and sear are in their normal position the catch 87 is engaged with a projection 91 on the sear so that when the trigger is pulled the sear is carried downward and disengaged from the toe 75 on the cocking piece 74, when the spring 40 will operate the firing pin 38 to strike the primer as will be obvious. Further firing movement of the trigger allows the trigger catch 87 to slip over the projection 91 of the sear and the latter is then returned to its normal position before the trigger is released to permit same to engage the toe 75 of the cocking piece 74 for the next shot. When the trigger is released the spring 86 returns same to normal position and the catch 87 rides over the projection 91 and engages the upper side of the latter for the next shot. The construction of trigger and sear just described is very essential and necessary in an arm of this type to prevent a second shot being fired while the trigger is held at the limit of its firing movement, the action of the mechanism being quicker than the trigger can ordinarily be released.

The arm also embodies an improved safety lock comprising a substantially circular cavity 92 within which slides a bar 93 having a cutaway portion 94 the width of the sear 82. When this cutaway portion 94 registers with the sear the latter can be pulled downward by the trigger to release the cocking piece 74. In other positions of the bar 93 the sear 82 is locked against downward movement. This bar 93 is slidably mounted in the receiver 31 for movement transversely of the latter, a spring 95 normally holding the bar in locking position with respect to the sear, while a cam thumb piece 96 pivoted on the end of the bar serves to draw and hold same in released position against the influence of said spring 95. It will be obvious that instead of a sliding motion a suitable rotary motion could be given the bar 93 to perform the same function.

The magazine of the arm is of the usual type and embodies a magazine spring 97 pressing upward on a movable follower 98 which forces the cartridge into loading position. The follower, however, has formed on its rear end a projection 99 which slides in a vertical groove 100 in the guard 101. On the rear side of the guard 101 a bolt stop 102 is arranged to slide vertically. This bolt stop has a projection 103 passing over the groove 100 which is adapted to be engaged by the projection 99 on the follower 98 when the last cartridge leaves the magazine. Upon the succeeding retraction of the bolt 37 the follower 98 presses the bolt stop 102 upward and into the path of the bolt so as to engage the front end of the latter and prevent same together with the slide from going forward under the influence of the recoil spring 47. The lower end of the bolt stop 102 is provided with a projection 104 which may be engaged by the end of a bolt stop release trigger 105. This trigger is normally held in the position shown in Fig. 1 by a spring 106, which also serves to operate a pivoted catch 107 bearing against the floor plate 108 of the magazine to hold the latter interlocked with the guard. The bolt stop release trigger 105 projects forward through a slot 109 in the guard 101 and is pivoted to said guard. It will be obvious that when the bolt stop is disposed in locking relation to the bolt a rearward pull on the trigger 105 will move the stop downward and release the bolt, which latter then moves forward under the action of the slide and recoil spring.

It will be obvious upon an inspection of Fig. 10 that when the slide 36 is in its forward position that the mechanism is completely closed against the entrance of dust or foreign matter, except for the slot 34 in the receiver which is provided to allow the necessary movement of the operating handle A. To cover this slot and thus completely inclose the mechanism, I have provided a clip spring cover 110 arranged to slide on a lug rib 111 on the receiver which incloses the enlargement 45 on the slide. This cover is slotted to receive pins 112 attached to the receiver to prevent the cover being disengaged therefrom. To completely inclose the mechanism the cover is pushed forward with the hand. When the piece is fired this cover is carried to the rear by the operating handle and left in that position until it is again desired to close the slot 34 when it is pushed forward by hand.

The ejector 113 is the usual type operated by one of the locking lugs of the bolt, while the extractor 114 is of the usual spring hook type engaged in an annular groove at the front end of the bolt. This extractor is retained in position by a collar 115 rotatably mounted in a circumscribing groove in the bolt.

Assuming the bolt 37 to be locked and a cartridge in the cartridge chamber of the barrel it will be obvious that rearward movement of the trigger 85 will disengage the sear 82 from the toe 75 of the cocking piece to permit the striker 38 to move forward and fire the charge. The inclination of the locking faces of the locking lugs of the bolt and receiver is such that they will be ineffective to impart any unlocking rotation while the face of the bolt is subjected to the maximum gas pressure obtaining at the instant of firing. As the bullet nears the muzzle and the pressure against the face of the bolt is reduced the locking faces on the locking lugs become effective to impart the necessary unlocking rotation to the bolt and upon the completion of this unlocking rotation the remaining gas pressure will drive the bolt and slide to the rear of the receiver and compress the recoil spring 47. It will be noted that when the unlocking rotation is imparted to the bolt the cams 49 and 50 will coöperate to move the slide rearwardly relatively to the bolt so that the slide must partake of a greater forward movement than the bolt to regain its normal forward position. After the bolt has completed its unlocking rotation the slide and bolt move to the rear in unison. When the recoil of the slide and bolt has been absorbed the spring 47 reacts and forces the slide and bolt forward, the bolt being prevented from rotating until it reaches its forward position by its lugs 41 and 42 riding on the guide walls of the receiver. As the bolt reaches its forward position, where it is free to rotate, previous to the slide completing its forward movement it will be obvious that this excess forward movement of the slide will operate through the cams 49 and 50 to impart the necessary locking rotation to the bolt.

I have discovered by actual test that the angle of inclination of the locking faces of the locking lugs of the receiver and bolt with respect to a plane perpendicular to the longitudinal axis of the bolt can be adjusted so that the bolt will remain fully locked until the bullet almost reaches the muzzle and consequently the pressure of the expanded gases is very much reduced, but that immediately after the bullet leaves the muzzle the necessary unlocking rotation will be imparted to the bolt by the resulting reduced gas pressure. This feature renders the mechanism safe against dangerous blowbacks while the bore is filled with gases under high pressures and utilizes only the comparatively low pressures left in the bore as the bullet nears or reaches the muzzle and allows the escape of gases. The angle of the locking faces of the locking lugs of the receiver and bolt will vary according to variations in the ammunition and construction of the mechanism to be operated but same can be readily determined by experiment for the particular mechanism and ammunition.

While I have illustrated and described one form of carrying my invention into practice in connection with a shoulder arm it will be obvious that various changes in arrangement and construction can be resorted to without departing from the scope of the claims. It will also be evident that the principle of this invention can be utilized in constructing a machine gun, automatic pistol or other arm and that it is not limited in its application to a shoulder fire-arm.

What I claim is:—

1. In a firearm, the combination of a receiver, a rotatable and slidable breech bolt in the receiver, and a plurality of coöperating locking lugs on the receiver and bolt respectively, said lugs having their coacting faces inclined at such an angle to a plane perpendicular to the axis of rotation of the bolt as will render the coacting faces of the lugs ineffective to impart any unlocking rotation to the bolt while the face of the latter is subjected to the maximum powder pressure obtaining while the bullet remains in the bore and effective to impart complete unlocking rotation to the bolt when the latter is subjected to the reduced pressure obtaining as the bullet leaves the bore.

2. In a firearm, the combination of a receiver, a breech bolt slidable in the receiver a slide reciprocating in the receiver and having a longitudinal passage therein, a detachable handle carried by the slide, forming an abutment at one end of the passage, and a recoil spring having one end engaged in said passage and against the handle.

3. In a firearm, the combination of a receiver, a breech bolt slidably and rotatably mounted in the receiver, a slide reciprocating in the receiver in unison with and having a greater forward movement than the bolt, said slide having a rearwardly opening longitudinal cavity therein disposed eccentric with respect to the bolt, a recoil spring having one end engaged in the cavity, and coacting cams on the slide and bolt operating under the influence of the excess forward movement of the slide to impart locking rotation to the bolt.

4. In a firearm, a pivoted sear, a bar slidable through a corresponding opening in the sear, said bar having a notch therein adapted to permit pivotal movement of the sear when disposed entirely in the plane of the sear, said bar locking the sear against pivotal movement in all other positions of the notch, means for normally holding the bar in position to lock the sear against pivotal movement, and a cam lever pivoted to one end of the bar and coöperating with a fixed part of the arm when moved in one direction to slide the bar to a position to permit pivotal movement of the sear.

5. In a firearm, the combination of a receiver provided with a flat guide surface having a notch at a predetermined point therein, a sliding member in the receiver, and a handle detachably interlocking with the member and adapted to be disengaged from the member by rotation thereof in one direction, said handle having a flat face engaging the guide face of the receiver to lock the handle against disengaging rotation, and permitting such rotation when the flat face of the handle is disposed within the limits of said notch.

6. In a firearm, the combination of a receiver having a cap detachably engaged on its rear end and further having a notch in its inner wall forward of the cap, a breech bolt slidable in the receiver, a recoil spring normally holding the bolt in its forward position, a guide member for said spring detachably interlocking with the cap and receiver, and a projection on the member adapted to be detachably engaged in said notch to hold the guide member out of interlocking relation with the cap to permit assembling and disassembling of the latter.

7. In a firearm, the combination of a receiver, a sliding member therein provided with a cavity, a recoil spring normally holding the sliding member in its forward position and having a portion thereof housed in said cavity, and a handle detachably interlocking with the sliding member and provided with a cavity forming a prolongation of the cavity in the sliding member and receiving the recoil spring.

8. In a firearm, the combination of a receiver, a sliding member therein provided with a cavity, a recoil spring normally holding the sliding member in its forward position and having a portion thereof housed in said cavity, and a handle detachably interlocking with the sliding member and adapted to be disengaged by rotation thereof when the sliding member is in a predetermined position, said handle being provided with a cavity forming a continuation of the cavity in a sliding member and receiving the recoil spring whereby said spring serves to prevent unlocking rotation of the handle.

9. In a firearm, the combination of a receiver, a sliding member therein, a handle carried by the sliding member, a spring latch carried by the handle and normally engaging a portion of the arm when the member is in its forward position to lock said member against rearward movement, and a rotatable member carried by the handle adapted when rotated to one position to positively hold the latch inactive against the influence of its spring.

In testimony whereof I affix my signature in the presence of two witnesses.

CREEDY C. SHEPPARD.

Witnesses:
ARTHUR P. MORAN,
A. C. DONOVAN.